United States Patent
Min et al.

(10) Patent No.: US 11,846,985 B2
(45) Date of Patent: Dec. 19, 2023

(54) DISPLAY DEVICE

(71) Applicant: Samsung Display Co., Ltd., Yongin-si (KR)

(72) Inventors: Myungan Min, Cheonan-si (KR); Hyoung-Jin Lee, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/748,347

(22) Filed: May 19, 2022

(65) Prior Publication Data

US 2023/0047392 A1 Feb. 16, 2023

(30) Foreign Application Priority Data

Aug. 13, 2021 (KR) .................. 10-2021-0107297

(51) Int. Cl.
*G06F 1/16* (2006.01)
(52) U.S. Cl.
CPC .......... *G06F 1/1616* (2013.01); *G06F 1/1656* (2013.01)
(58) Field of Classification Search
CPC .................................................. G06F 1/1616
See application file for complete search history.

(56) References Cited

U.S. PATENT DOCUMENTS

| | | | | |
|---|---|---|---|---|
| 11,307,613 B2* | 4/2022 | Yu | ........................ | H04M 1/0216 |
| 11,513,555 B2* | 11/2022 | Lee | ........................ | G06F 1/1652 |
| 11,551,586 B2* | 1/2023 | Ha | ........................ | G06F 1/1656 |
| 11,570,910 B2* | 1/2023 | Kim | ........................ | H05K 5/0017 |
| 2017/0139663 A1* | 5/2017 | Ahn | ........................ | G09G 3/2092 |
| 2020/0190277 A1 | 6/2020 | Hou et al. | | |
| 2022/0039274 A1* | 2/2022 | Shin | ........................ | G06F 1/1618 |
| 2022/0075411 A1* | 3/2022 | Lee | ........................ | H04M 1/0268 |
| 2022/0075415 A1* | 3/2022 | Ran | ........................ | G06F 1/1679 |
| 2022/0103670 A1* | 3/2022 | Liao | ........................ | H04M 1/0216 |
| 2022/0174823 A1* | 6/2022 | Kim | ........................ | H04M 1/0216 |
| 2022/0199951 A1* | 6/2022 | Ryu | ........................ | H10K 50/844 |
| 2022/0377949 A1* | 11/2022 | Kim | ........................ | H05K 7/20963 |
| 2023/0047392 A1* | 2/2023 | Min | ........................ | G06F 1/1641 |
| 2023/0092852 A1* | 3/2023 | Lee | ........................ | G06F 1/1652 |

FOREIGN PATENT DOCUMENTS

| | | |
|---|---|---|
| KR | 10-2019-0060904 | 6/2019 |
| KR | 10-2019-0140465 | 12/2019 |
| KR | 10-2020-0012359 | 2/2020 |

* cited by examiner

*Primary Examiner* — Lisa Lea-Edmonds
(74) *Attorney, Agent, or Firm* — KILE PARK REED & HOUTTEMAN PLLC

(57) ABSTRACT

A display device includes a display panel including a first non-folding area, a second non-folding area, and a folding area, a first upper plate disposed under the display panel and overlapping the first non-folding area, a second upper plate disposed under the display panel, overlapping the second non-folding area, arranged to be spaced apart from the first upper plate, a separation space being disposed therebetween and overlapping at least a portion of the folding area in an unfolded state, and a screen layer disposed under the first upper plate and the second upper plate. The screen layer includes first lines, second lines arranged in a weave pattern with the first lines, and a lower coating layer covering a lower portion of the first lines and the second lines and overlaps the separation space.

20 Claims, 9 Drawing Sheets

DISPLAY DEVICE

CROSS-REFERENCE TO RELATED APPLICATION(S)

This U.S. non-provisional patent application claims priority to and benefits of Korean Patent Application No. 10-2021-0107297 under 35 U.S.C. § 119, filed on Aug. 13, 2021, the entire contents of which are incorporated herein by reference.

BACKGROUND

1. Technical Field

The disclosure relates to a display device. More particularly, the disclosure relates to a foldable display device.

2. Description of the Related Art

A display device includes a display area that is activated in response to electrical signals. The display device senses an input applied thereto from the outside through the display area and substantially simultaneously displays images to provide a user with information. In recent years, with the development of the display devices having a variety of shapes, the display areas are being designed to have various shapes. In addition, the display devices that are able to be changed into various shapes are being developed to improve portability for the user and to make better use of residential spaces.

SUMMARY

The disclosure provides a foldable display device with improved reliability.

Embodiments of the disclosure provide a display device including a display panel including a first non-folding area, a second non-folding area, and a folding area disposed between the first non-folding area and the second non-folding area and foldable with respect to a folding axis extending in a first direction, a first upper plate disposed under the display panel and overlapping the first non-folding area in a plan view, a second upper plate disposed under the display panel, overlapping the second non-folding area in a plan view, and arranged to be spaced apart from the first upper plate in a second direction intersecting the first direction, a separation space being disposed between the first and second upper plates and overlapping at least a portion of the folding area in a plan view in an unfolded state, and a screen layer disposed under the first upper plate and the second upper plate. The screen layer includes first lines, second lines arranged in a weave pattern with the first lines, and a lower coating layer covering a lower portion of the first lines and the second lines, and the screen layer overlaps the separation space in a plan view.

Each of the first and second upper plates may include an upper surface disposed adjacent to the display panel and a side surface defining the separation space, the upper surface of the first upper plate may face the upper surface of the second upper plate in a folded state, and the screen layer may contact the side surface of the first upper plate and the side surface of the second upper plate in the folded state.

The first lines may extend in the first direction, may be arranged in the second direction, and may include a steel fiber, and the second lines may extend in the second direction, may be arranged in the first direction, and may include a synthetic fiber.

The first lines may extend in the first direction, may be arranged in the second direction, and may have a strength stronger than the second lines, and the second lines may extend in the second direction, may arranged in the first direction, and may have an elasticity higher than the first lines.

The screen layer may further includes an upper coating layer covering an upper portion of the first and second lines.

Each of the upper coating layer and the lower coating layer may include a thermoplastic polyurethane elastomer.

The display device may further include a first adhesive layer disposed between the first upper plate and the screen layer, and a second adhesive layer disposed between the second upper plate and the screen layer. Each of the first adhesive layer and the second adhesive layer may not overlap the folding area in a plan view.

Each of the second lines may include valley areas each disposed under one of the first lines in a cross-section, and ridge areas each disposed on another one of the first lines in the cross-section, and the valley areas may be alternately arranged with the ridge areas.

Each of the second lines may include valley areas each disposed under two of the first lines in a cross-section, and ridge areas each disposed on one of the first lines in the cross-section, and the valley areas may be alternately arranged with the ridge areas.

Each of the second lines includes valley areas each disposed under four of the first lines in a cross-section and ridge areas each disposed on one of the first lines in the cross-section, and the valley areas may be alternately arranged with the ridge areas.

The screen layer may have a width equal to or greater than about 1 millimeter in a cross-section in the unfolded state.

The display device may further include lower plates disposed under the screen layer, and the lower plates may include a first lower plate overlapping the first non-folding area in a plan view and a second lower plate disposed to be spaced apart from the first lower plate.

Embodiments of the disclosure provide a display device including a display panel including a first non-folding area, a second non-folding area, and a folding area disposed between the first non-folding area and the second non-folding area and folded with respect to an imaginary folding axis extending in a first direction, a first upper plate disposed under the display panel and overlapping the first non-folding area in a plan view, a second upper plate disposed under the display panel, overlapping the second non-folding area in a plan view, and arranged to be spaced apart from the first upper plate, and a screen layer disposed under the first upper plate and the second upper plate and overlapping the folding area in a plan view. The screen layer includes first lines extending in the first direction and arranged in a second direction intersecting the first direction, second lines extending in the second direction to intersect the first lines and arranged in a weave pattern with the first lines, and a lower coating layer covering a lower portion of the first lines and the second lines. The second lines have an elasticity greater than an elasticity of the first lines.

The first lines may include a steel fiber, and the second lines may include a synthetic fiber.

The screen layer may further include an upper coating layer covering an upper portion of the first and second lines.

Each of the upper coating layer and the lower coating layer may include a thermosetting polyurethane elastomer.

Each of the second lines may include valley areas each disposed under one of the first lines in a cross-section, and ridge areas each disposed on another one of the first lines in the cross-section, and the valley areas may be alternately arranged with the ridge areas.

Each of the second lines may include valley areas each disposed under two of the first lines in a cross-section, and ridge areas each disposed on one of the first lines in the cross-section, and the valley areas may be alternately arranged with the ridge areas.

Each of the second lines may include valley areas each disposed under four of the first lines in a cross-section, and ridge areas each disposed on one of the first lines in the cross-section, and the valley areas are alternately arranged with the ridge areas.

The first upper plate and the second upper plate may be arranged in the second direction, a separation space may be disposed between the first and second plates and overlap the folding area in a plan view in an unfolded state, and the screen layer may overlap the separation space in a plan view.

According to the above, the display device includes the screen layer covering the separation space between the first upper plate and the second upper plate. Thus, the screen layer prevents foreign substances from entering the display device through the separation space.

The display device includes the screen layer in which the fibers are arranged in the weave pattern. Thus, the screen layer is prevented from being torn when the screen layer contacts corners of the first and second upper plates, and the screen layer is prevented from being damaged.

Accordingly, a reliability of the foldable display device is improved.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1A:
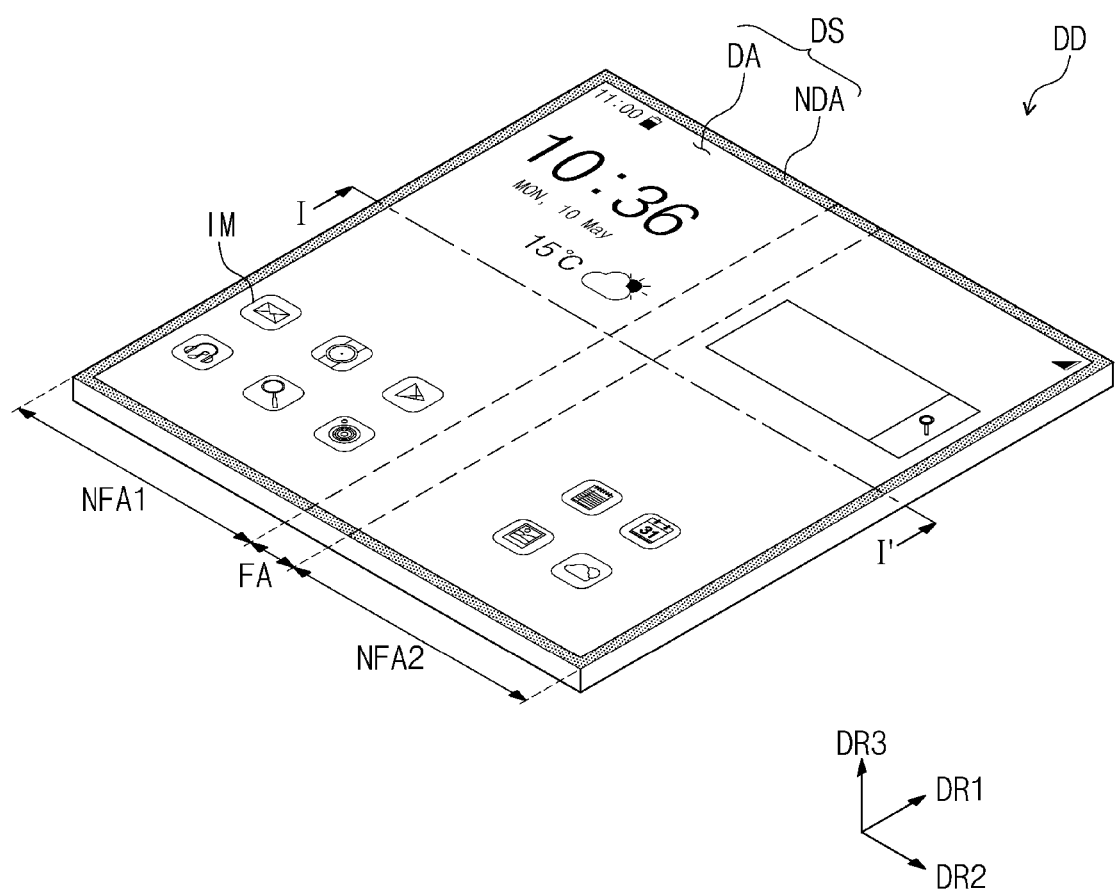
FIGS. 1A and 1B are perspective views schematically showing a display device according to an embodiment of the disclosure.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components may be exaggerated for effective description of the technical content. As used herein, the term "and/or" may include any and all combinations of one or more of the associated listed items.

It will be understood that, although the terms first, second, and the like may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms (or meanings) as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the disclosure will be explained in detail with reference to the accompanying drawings.

Figure 1B:
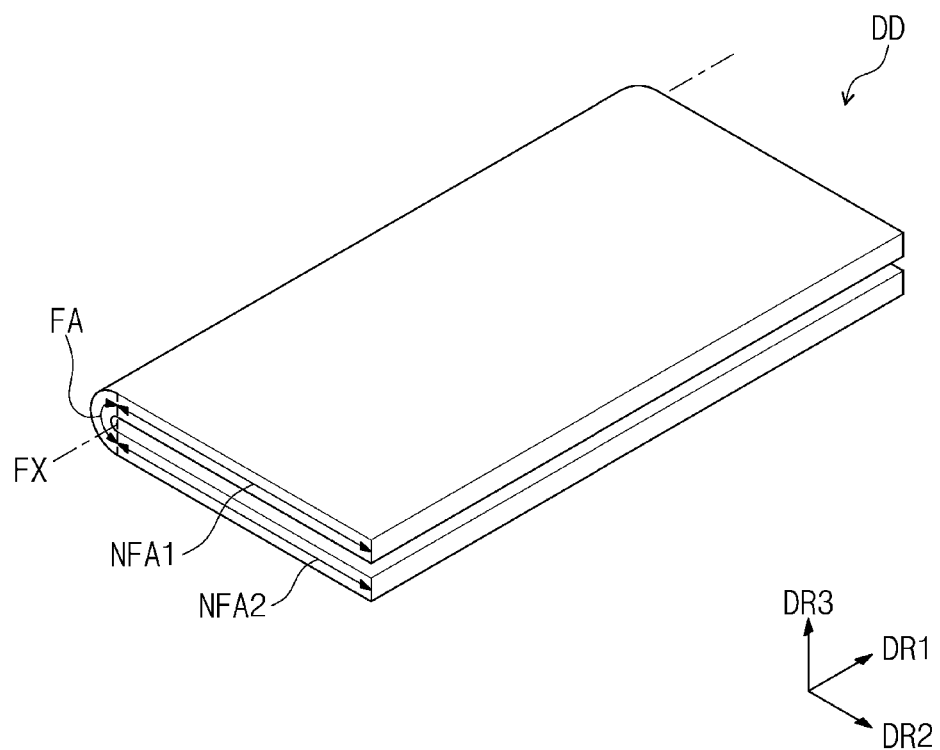

FIGS. 1A and 1B are schematic perspective views illustrating a display device DD according to an embodiment.

FIG. 1A illustrates the display device DD in an unfolded state, and FIG. 1B illustrates the display device DD in a folded state.

Referring to FIGS. 1A and 1B, the display device DD may include a display surface DS defined by a first direction DR1 and a second direction DR2 intersecting the first direction DR1. The display device DD may provide an image IM to a user through the display surface DS.

The display surface DS may include a display area DA and a non-display area NDA around the display area DA. The image IM may be displayed through the display area DA and may not be displayed through the non-display area NDA. The non-display area NDA may surround the display area DA. However, the disclosure is not limited thereto or thereby, and the shape of the display area DA and the shape of the non-display area NDA may be changed.

Hereinafter, a direction substantially perpendicular to a plane defined by the first direction DR1 and the second direction DR2 may be referred to as a third direction DR3. In the disclosure, the expression "when viewed in a plane" may mean a state of being viewed in the third direction DR3. Hereinafter, the first, second, and third directions DR1, DR2, and DR3 are directions indicated by first, second, and third directional axes, respectively, and are assigned with the same reference numerals as those of the first, second, and third directional axes.

The display device DD may include a folding area FA, a first non-folding area NFA1, and a second non-folding area NFA2. The folding area FA may be disposed between the first non-folding area NFA1 and the second non-folding area NFA2 in the second direction DR2.

As shown in FIG. 1B, the folding area FA may be folded about a folding axis FX substantially parallel to the first direction DR1. The folding area FA may have a curvature in the folded state. The display device DD may be in-folded so that the first non-folding area NFA1 and the second non-folding area NFA2 face each other and the display surface DS is not exposed to the outside.

According to an embodiment, the display device DD may be outwardly folded (or outer-folding or out-folded) such that the display surface DS is exposed to the outside. According to an embodiment, the display device DD may be configured to selectively perform the unfolding operation, the inner-folding (or in-folding) operation, and the out-folding operation. According to an embodiment, the display device DD may be configured to repeatedly perform the unfolding operation and the in-folding operation or may be configured to repeatedly perform the unfolding operation and the out-folding operation.

FIGS. 1A and 1B illustrate that the folding axis FX is defined as a major axis substantially parallel to long sides of the display device DD as an example. However, the disclosure is not limited thereto. According to an embodiment, the folding axis FX may be defined as a minor axis substantially parallel to short sides of the display device DD.

Figure 2A:
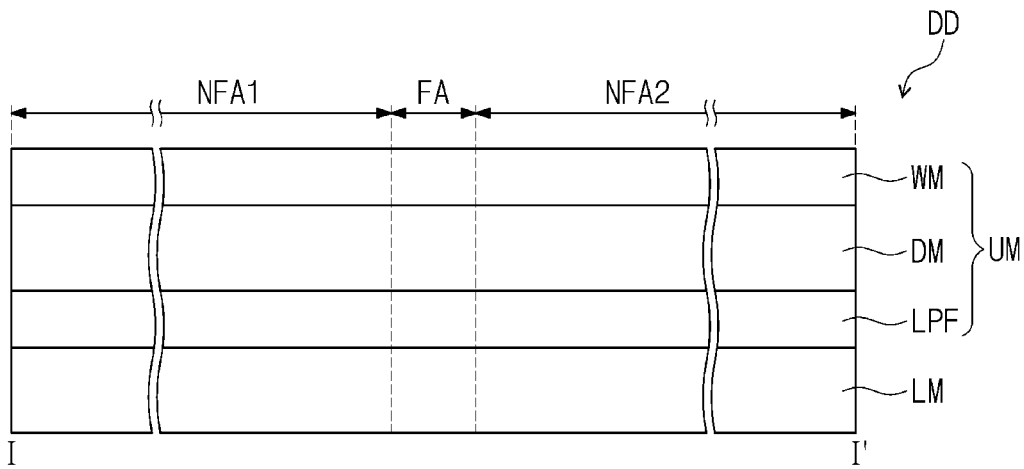
FIG. 2A is a cross-sectional view schematically showing a display device according to an embodiment of the disclosure.
Figure 2A:
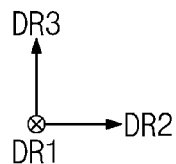
Figure 2B:
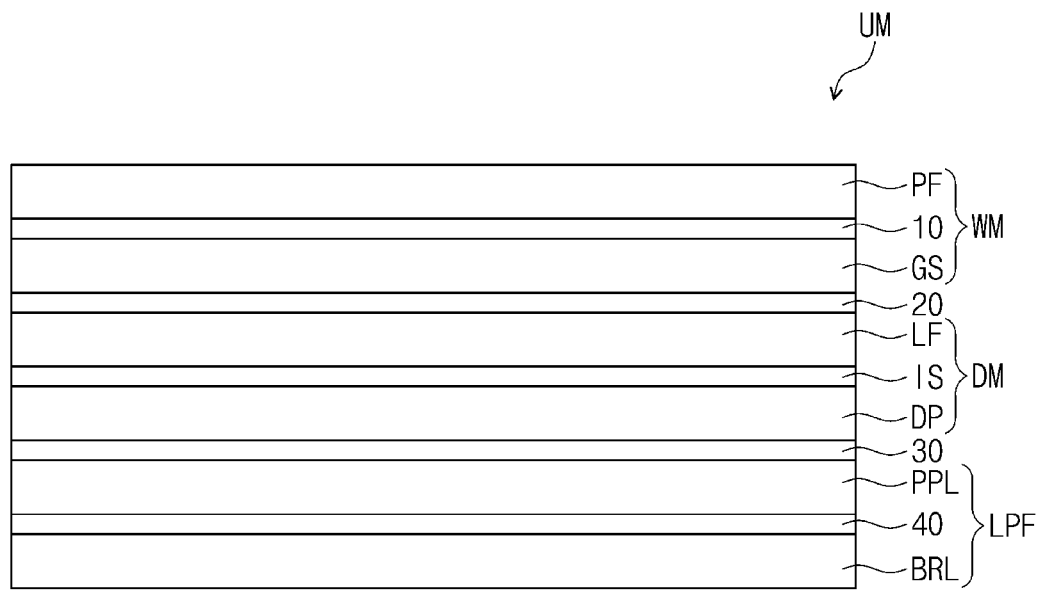
FIG. 2B is a cross-sectional view schematically showing an upper member according to an embodiment of the disclosure.
Figure 2B:
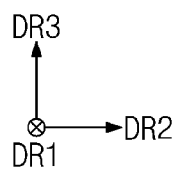
Figure 2C:
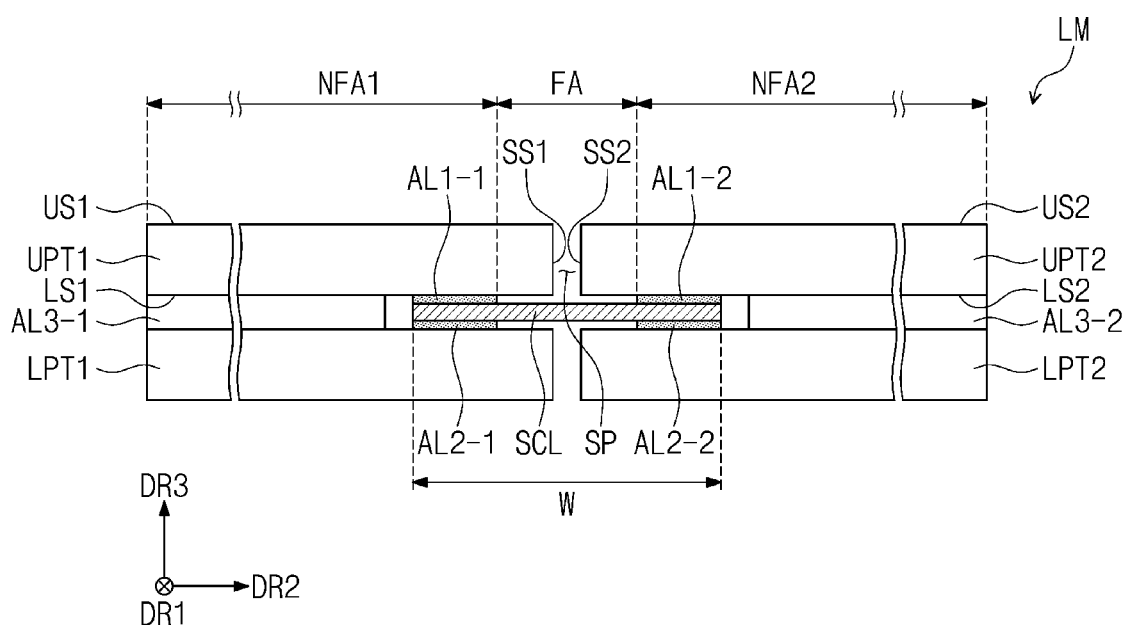
FIG. 2C is a cross-sectional view schematically showing a lower member according to an embodiment of the disclosure.

FIG. 2A is a cross-sectional view schematically illustrating the display device DD according to an embodiment, taken along line I-I' of FIG. 1A. FIG. 2B is a schematic cross-sectional view illustrating an upper member UM according to an embodiment. FIG. 2C is a schematic cross-sectional view illustrating a lower member LM according to an embodiment. FIGS. 2A to 2C are schematic cross-sectional views viewed in the first direction DR1.

Referring to FIG. 2A, the display device DD may include an upper member UM and a lower member LM disposed under the upper member UM. The upper member UM may include a window module WM, a display module DM disposed under the window module WM, and a lower protective film LPF disposed under the display module DM. An adhesive layer may be disposed between the window module WM, the display module DM, and the lower protective film LPF as needed.

Referring to FIG. 2B, the upper member UM may include a window protective layer PF, a thin film glass substrate GS, an anti-reflective member LF, an input sensor IS, a display panel DP, a panel protective layer PPL, a barrier layer BRL, and first, second, third, and fourth upper adhesive layers 10, 20, 30, and 40.

The window module WM may include the thin film glass substrate GS, the window protective layer PF disposed on the thin film glass substrate GS, and the first upper adhesive layer 10 attaching the thin film glass substrate GS to the window protective layer PF.

The thin film glass substrate GS may have a thickness of about 15 μm to about 45 μm. The thin film glass substrate GS may be chemically strengthened glass. The thin film glass substrate GS may minimize occurrence of creases even in case that folding and unfolding operations are repeated.

The window protective layer PF may have a thickness of about 50 μm to about 80 μm. The window protective layer PF may include polyimide (PI), polycarbonate (PC), polyamide (PA), triacetylcellulose, polymethylmethacrylate (PMMA), or polyethylene terephthalate (PET). Although not shown in the drawings, at least one of a hard-coating layer, an anti-fingerprint layer, and an anti-reflective layer may be disposed on an upper surface of the window protective layer PF.

The first upper adhesive layer 10 may be a pressure sensitive adhesive (PSA) film or an optically clear adhesive (OCA) member. As described hereinafter, the display device DD may further include the second, third, and fourth upper adhesive layers 20, 30, and 40. The second, third, and fourth upper adhesive layers 20, 30, and 40 may also be the pressure sensitive adhesive (PSA) film or the optically clear adhesive (OCA) member and may include an ordinary adhesive.

The display module DM may be disposed under the window module WM. The display module DM may be combined with (or attached to) the window module WM by the second upper adhesive layer 20.

The display module DM may include the display panel DP, the input sensor IS disposed on the display panel DP, and the anti-reflective member LF disposed on the input sensor IS.

The display panel DP may include a base layer, a circuit element layer disposed on the base layer, a display element layer disposed on the circuit element layer, and a thin film encapsulation layer disposed on the display element layer. The base layer may include a plastic film. As an example, the base layer may include polyimide.

The circuit element layer may include an organic layer, an inorganic layer, a semiconductor pattern, a conductive pattern, and a signal line. An organic layer, an inorganic layer, a semiconductor layer, and a conductive layer may be formed on the base layer by a coating or depositing process. The organic layer, the inorganic layer, the semiconductor layer, and the conductive layer may be selectively patterned by photolithography processes, and thus, the semiconductor pattern, the conductive pattern, and the signal line may be formed.

The display element layer may be disposed on the circuit element layer. The display element layer may include a light emitting element. For example, the light emitting element may include an organic light emitting material, a quantum dot, a quantum rod, or a micro light-emitting diode (LED).

The thin film encapsulation layer may be disposed on the display element layer. The thin film encapsulation layer may include an inorganic layer, an organic layer, and an inorganic layer, which are sequentially stacked. However, layers included in the thin film encapsulation layer should not be limited thereto or thereby. The inorganic layers may protect the display element layer from moisture and oxygen, and the organic layer may protect the display element layer from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer. However, the disclosure is not limited thereto.

The input sensor IS may sense an external input applied thereto from the outside. The external input may include a variety of inputs provided from the outside of the display device DD. As an example, the external inputs may include a proximity input (e.g., hovering) applied in case that a device or member approaches or is adjacent to the display device DD at a distance (e.g., a predetermined or selected distance) as well as a touch input by a part of the user's body (e.g., the user's hand). The external inputs may be provided in the form of force, pressure, or light. However, the disclosure is not limited thereto or thereby.

The input sensor IS may be directly formed on the thin film encapsulation layer by successive processes in case that the display panel DP is manufactured. However the disclosure is not limited thereto or thereby. According to an embodiment, the input sensor IS may be attached to the display panel DP by an adhesive layer after being manufactured separately from the display panel DP.

The anti-reflective member LF may reduce a reflectance with respect to external light. The anti-reflective member LF may include a retarder and/or a polarizer. The anti-reflective member LF may include at least a polarization film. The anti-reflective member LF may include a color filter and a black matrix.

The lower protective film LPF may be disposed under the display panel DP. The lower protective film LPF may be combined with the display panel DP by the third upper adhesive layer 30.

The lower protective film LPF may include the panel protective layer PPL and the barrier layer BRL disposed under the panel protective layer PPL. The barrier layer BRL may be combined with the panel protective layer PPL by the fourth upper adhesive layer 40.

The panel protective layer PPL may protect a lower portion of the display panel DP. The panel protective layer PPL may include a flexible plastic material. The panel protective layer PPL may prevent a scratch from occurring on a rear surface of the display panel DP during a manufacturing process of the display panel DP. The panel protective layer PPL may be a colored polyimide film. As an example, the panel protective layer PPL may be an opaque yellow film. However, the disclosure is not limited thereto or thereby.

The barrier layer BRL may increase a resistance to a compressive force caused by external pressure. Accordingly, the barrier layer BRL may prevent the display panel DP from being deformed. The barrier layer BRL may include a flexible plastic material such as polyimide or polyethylene terephthalate.

The barrier layer BRL may absorb light incident thereto from the outside. The barrier layer BRL may include a light blocking material or may be a colored film with low light transmittance. Accordingly, when looking at the display module DM from the above of the window module WM, components disposed under the barrier layer BRL may not be visible to the user.

Components included in the upper member UM should not be limited thereto or thereby. Among the above-described components, at least some components may be omitted, or other components may be added to the upper member UM.

Referring to FIG. 2C, the lower member LM may include upper plates UPT1 and UPT2, a screen layer SCL, lower plates LPT1 and LPT2, and first to third adhesive layers AL1-1, AL1-2, AL2-1, AL2-2, AL3-1, and AL3-2.

The upper plates UPT1 and UPT2 may be disposed under the lower protective film LPF. The upper plates UPT1 and UPT2 may include a first upper plate UPT1 and a second upper plate UPT2.

The first upper plate UPT1 may be disposed to overlap the first non-folding area NFA1 and a portion of the folding area FA. The second upper plate UPT2 may be disposed to overlap the second non-folding area NFA2 and a portion of the folding area FA.

Each of the first upper plate UPT1 and the second upper plate UPT2 may be a metal plate. As an example, the first upper plate UPT1 and the second upper plate UPT2 may include a stainless steel, an aluminum, or an alloy thereof. The upper plates UPT1 and UPT2 may support components disposed thereon and may maintain the unfolded state and the folded state of the display device DD.

According to the disclosure, the first upper plate UPT1 and the second upper plate UPT2 may be arranged to be spaced apart from each other in the second direction DR2 with a separation space (e.g., a predetermined or selected separation space) SP interposed therebetween. The separation space SP between the first and second upper plates UPT1 and UPT2 may overlap the folding area FA.

The first upper plate UPT1 may include a first upper surface US1 neighboring the display panel DP, a first lower surface LS1 facing the first upper surface US1, and a first side surface SS1 connecting (or extended to) the first upper surface US1 and the first lower surface LS1. The second upper plate UPT2 may include a second upper surface US2 neighboring the display panel DP, a second lower surface LS2 facing the second upper surface US2, and a second side surface SS2 connecting (or extended to) the second upper surface US2 and the second lower surface LS2. The first side surface SS1 and the second side surface SS2 may define the separation space SP.

The screen layer SCL may be disposed under the first upper plate UPT1 and the second upper plate UPT2. According to an embodiment, the screen layer SCL may be disposed to overlap (e.g., in a plan view) a portion of the first upper plate UPT1, a portion of the second upper plate UPT2, and the separation space SP. For example, the screen layer SCL may be disposed to entirely overlap the separation space SP.

Accordingly, the screen layer SCL may prevent foreign substances from entering the display device DD through the separation space SP in the unfolded state of the display device DD. The screen layer SCL may prevent foreign substances from entering the upper member UM, which is exposed without being covered by the first upper plate UPT1 and the second upper plate UPT2, in the folded state of the display device DD.

According to the disclosure, the screen layer SCL may include a component containing a material with elasticity and resiliency to secure a folding property and may include a component containing a material with strength to prevent damages from occurring due to external impacts such as a shear stress. This will be described in detail later.

According to an embodiment, the screen layer SCL may have a width W equal to or greater than about 1 millimeter in the second direction DR2 in the unfolded state when viewed in a cross-section. In case that the width W of the screen layer SCL is smaller than about 1 millimeter, it is insufficient for the screen layer SCL to withstand a tensile stress caused by the stretching of the screen layer SCL in case that the display device DD is folded.

The screen layer SCL may be attached to the first upper plate UPT1 and the second upper plate UPT2 by the first adhesive layers AL1-1 and AL1-2. The first adhesive layers AL1-1 and AL1-2 may include a first-first adhesive layer AL1-1 disposed under the first upper plate UPT1 and a first-second adhesive layer AL1-2 disposed under the second upper plate UPT2.

According to an embodiment, the first-first adhesive layer AL1-1 and the first-second adhesive layer AL1-2 may be disposed not to overlap the folding area FA. In case that the first-first adhesive layer AL1-1 or the first-second adhesive layer AL1-2 is disposed to overlap the folding area FA, it is difficult for the elastic screen layer SCL to be stretched smoothly in case that the display device DD is folded, and as a result, the screen layer SCL may be damaged due to a stress.

The lower plates LPT1 and LPT2 may be disposed under the screen layer SCL. The lower plates LPT1 and LPT2 may include a first lower plate LPT1 disposed to overlap the first non-folding area NFA1 and a second lower plate LPT2 disposed to overlap the second non-folding area NFA2. The first lower plate LPT1 and the second lower plate LPT2 may be spaced apart from each other in the folding area FA.

According to an embodiment, each of the first and second lower plates LPT1 and LPT2 may include a metal alloy. The lower plates LPT1 and LPT2 may prevent components disposed on the lower plates LPT1 and LPT2 from being deformed.

The lower plates LPT1 and LPT2 and the screen layer SCL may be attached to each other by the second adhesive layers AL2-1 and AL2-2. The second adhesive layers AL2-1 and AL2-2 may include a second-first adhesive layer AL2-1 disposed on the first lower plate LPT1 and a second-second adhesive layer AL2-2 disposed on the second lower plate LPT2.

The second-first adhesive layer AL2-1 and the second-second adhesive layer AL2-2 may be disposed not to overlap (e.g., in a plan view) the folding area FA. In case that the second-first adhesive layer AL2-1 and the second-second adhesive layer AL2-2 are disposed to overlap the folding area FA, the stress generated in the screen layer SCL during the folded state may be transferred to the lower plates LPT1 and LPT2.

Remaining areas of the lower portions of the upper plates UPT1 and UPT2 except the area in which the screen layer SCL is disposed may contact the lower plates LPT1 and LPT2 by the third adhesive layers AL3-1 and AL3-2, respectively. The third adhesive layers AL3-1 and AL3-2 may include a third-first adhesive layer AL3-1 and a third-second adhesive layer AL3-2.

The third-first adhesive layer AL3-1 may be disposed under the first lower surface LS1 of the first upper plate UPT1 in an area which does not overlap the screen layer SCL and may be coupled (or connected) to the first lower plate LPT1. The third-second adhesive layer AL3-2 may be disposed under the second lower surface LS2 of the second upper plate UPT2 in an area which does not overlap the screen layer SCL and may be coupled to the second lower plate LPT2.

Components included in the lower member LM should not be limited to the above-mentioned components. Additional members may be provided under the lower plates LPT1 and LPT2. As an example, the lower member LM may further include a cushion member, a heat dissipation member, an insulating member, or the like. According to an embodiment, the lower plates LPT1 and LPT2 may be omitted.

Figure 3A:
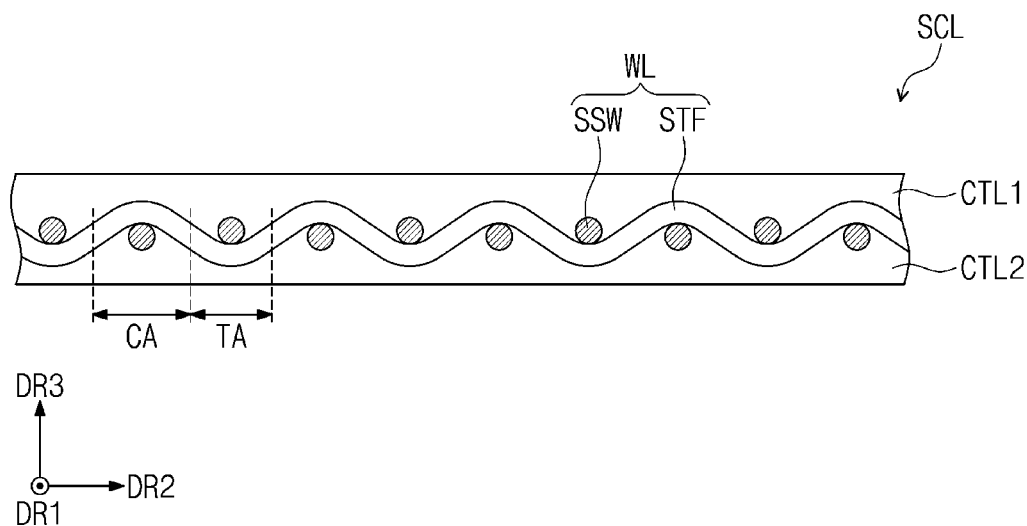
FIG. 3A is a cross-sectional view schematically showing a screen layer according to an embodiment of the disclosure.
Figure 3B:
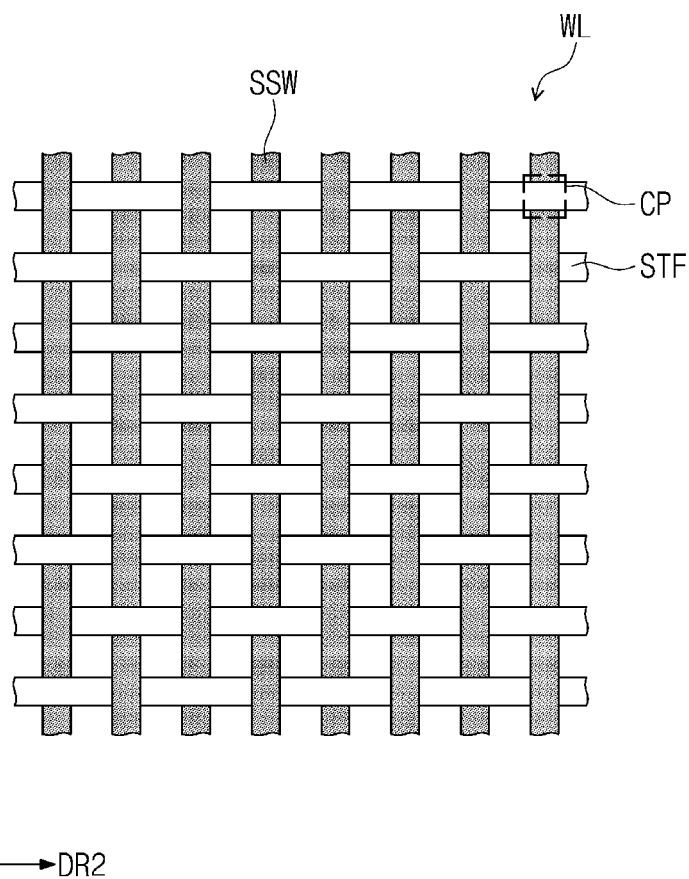
FIG. 3B is a plan view schematically showing a portion of woven lines according to an embodiment of the disclosure.
Figure 3C:
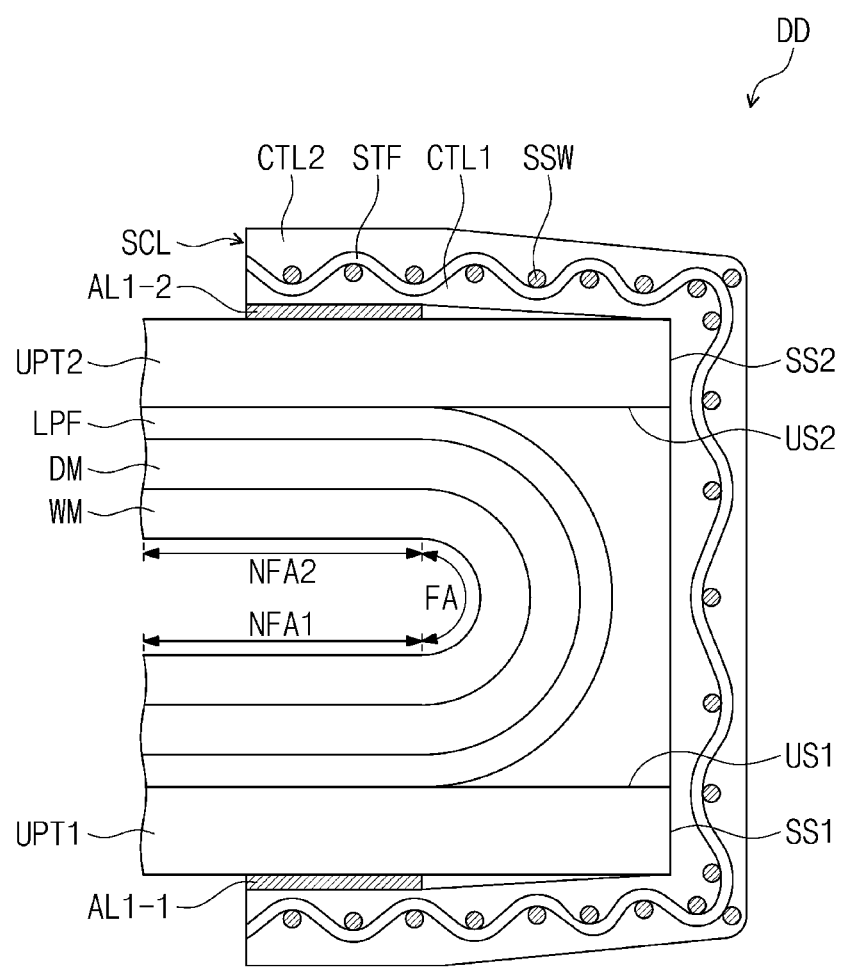
FIG. 3C is an enlarged cross-sectional view schematically showing a portion of a display device in a folded state according to an embodiment of the disclosure.

FIG. 3A is a schematic cross-sectional view illustrating the screen layer SCL according to an embodiment. FIG. 3B is a schematic plan view illustrating a portion of woven lines WL according to an embodiment. FIG. 3C is a schematic enlarged cross-sectional view illustrating a portion of the display device DD in a folded state according to an embodiment. Referring to FIG. 3A, the screen layer SCL according to an embodiment may include the woven lines WL, an upper coating layer CTL1, and a lower coating layer CTL2.

Referring to FIGS. 3A and 3B, the woven lines WL may include first lines SSW and second lines STF. The first lines SSW may extend in the first direction DR1 and may be arranged in the second direction DR2. The second lines STF may extend in the second direction DR2 to intersect the first lines SSW and may be arranged in the first direction DR1.

According to the disclosure, the first lines SSW and the second lines STF may be arranged to intersect each other in a woven shape. According to an embodiment, the first lines SSW and the second lines STF may be woven in a plain weave as shown in FIGS. 3A and 3B.

Referring to FIG. 3A, each of the second lines STF may include a ridge area CA curved in a direction toward the upper coating layer CTL1 and a valley area TA curved in a direction toward the lower coating layer CTL2 when viewed in a cross-section in the first direction DR1. A first line may be disposed under the ridge area CA, and a first line may be disposed on the valley area TA.

Each of the second lines STF may include ridge areas CA and valley areas TA alternately arranged with each other. For example, each of the second lines STF may be disposed to have a wave shape when viewed in a cross-section.

Although a cross-section viewed in the second direction DR2 is not shown separately, the first lines SSW and the second lines STF when viewed in the second direction DR2 may have a cross-section similar to the cross-section thereof when viewed in the first direction DR1. The first lines SSW may have a structure in which the ridge areas are alternately arranged with the valley areas in the cross-section viewed in the second direction DR2. A second line may be disposed under each of the ridge areas, and a second line may be disposed on each of the valley areas.

Based on a structure in which the first line is disposed at an upper side and the second line is disposed at a lower side, portions at which the first line is disposed at the lower side and the second line is disposed at the upper side may be defined as crossing points CP. In case that the first lines SSW and the second lines STF are woven in a plain weave pattern, the number of the crossing points CP may be maximum. As the number of the crossing points CP increases, a toughness of the woven lines WL may increase. Accordingly, in case that the first lines SSW and the second lines STF are arranged in the plain weave, the toughest woven lines WL may be formed.

According to the disclosure, the first lines SSW may be formed of steel fibers. As an example, the first lines SSW may include a stainless steel. However, a material for the first lines SSW is not be particularly limited as long as the first lines SSW may have a strength stronger than that of the second lines STF.

As the first lines SSW extend in the first direction DR1 that is substantially perpendicular to a folding direction, the strength of the first lines SSW may increase without interfering with the bending of the screen layer SCL. Although the external impact is applied to the display panel DP (see FIG. 2B) and the shear stress is generated in the display panel DP, the display device DD may be prevented from being distorted or damaged.

The second lines STF may include a synthetic fiber with elasticity and resiliency. For example, the second lines STF may have elasticity higher than that of the first lines SSW. As an example, the second lines STF may include a high-elastic polyurethane fiber. However, a material for the second lines STF is not particularly limited as long as the second lines STF may have elasticity higher than that of the first lines SSW.

As the second lines STF extend in the second direction DR2 corresponding to the folding direction, the elasticity and the resiliency of the screen layer SCL may increase. Since the second lines STF are stretched well in the folding direction during the folding operation for the display device DD, the folding operation may be easily performed. The second lines STF may easily return to an original state in the process of unfolding the folded display device DD. Accordingly, damages such as plastic deformation to the second lines STF may be reduced even if the folding and unfolding operations are repeated, and thus, the reliability of the display device DD may be improved.

The upper coating layer CTL1 may be disposed on the first lines SSW and the second lines STF, and the lower coating layer CTL2 may be disposed under the first lines SSW and the second lines STF. The upper coating layer CTL1 may cover (or overlap in a plan view) an upper surface of the first lines SSW and the second lines STF, and the lower coating layer CTL2 may cover a lower surface of the first lines SSW and the second lines STF. Thus, damages to the first lines SSW and the second lines STF may be prevented.

According to an embodiment, each of the upper coating layer CTL1 and the lower coating layer CTL2 may include a thermoplastic polymer resin or a thermosetting polymer resin. As an example, each of the upper coating layer CTL1 and the lower coating layer CTL2 may include a thermoplastic polyurethane (TPU) elastomer. However, materials for the upper coating layer CTL1 and the lower coating layer CTL2 should not be particularly limited as long as they have the elasticity and the resiliency.

Similar to the second lines STF, as the upper coating layer CTL1 and the lower coating layer CTL2 may also include a material with the elasticity and the resiliency, the screen layer SCL may be easily bent in case that the display device DD is folded. The screen layer SCL stretched in the unfolding operation for the display device DD may readily return to the original state, and damage such as plastic deformation on the screen layer SCL may be reduced.

FIG. 3C illustrates a cross-section of the display device DD in the folded state. FIG. 3C illustrates the cross-section of portions of the window module WM, the display module DM, the lower protective film LPF, the upper plates UPT1 and UPT2, the first adhesive layers AL1-1 and AL1-2, and the screen layer SCL.

In case that the display device DD is folded, the window module WM, the display module DM, and the lower protective film LPF may be bent. In detail, an area overlapping the first non-folding area NFA1 and an area overlapping the second non-folding area NFA2 may be disposed to face each other, and an area overlapping the folding area FA may be bent with respect to the folding axis FX (see FIG. 1B).

On the other hand, as the upper plates UPT1 and UPT2 include the first upper plate UPT1 and the second upper plate UPT2, which are arranged with the separation space SP (see FIG. 2C) interposed therebetween and overlapping the folding area FA, the first upper surface US1 (see FIG. 2C) of the first upper plate UPT1 and the second upper surface US2 (see FIG. 2C) of the second upper plate UPT2 may be disposed to face each other in the folded state.

As the screen layer SCL is disposed to overlap the separation space SP between the first upper plate UPT1 and the second upper plate UPT2, the screen layer SCL may be stretched as the first upper surface US1 of the first upper plate UPT1 and the second upper surface US2 of the second upper plate UPT2 become close to each other during the folding operation. Accordingly, as shown in FIG. 3C, the second lines STF disposed in the screen layer SCL may be stretched, and a distance between the first lines SSW disposed to intersect the second lines STF may increase.

As the first upper surface US1 of the first upper plate UPT1 and the second upper surface US2 of the second upper plate UPT2 are disposed to face each other in the folded state, an area of the upper member UM, which is not covered by the first upper plate UPT1 and the second upper plate UPT2, may increase, and the foreign substance may be introduced more easily compared with those in the unfolded state. However, the screen layer SCL may contact the first side surface SS1 of the first upper plate UPT1 and the second side surface SS2 of the second upper plate UPT2 in the folded state of the screen layer SCL, and thus, the area of the upper member UM exposed without being covered by the first upper plate UPT1 and the second upper plate UPT2 may be covered. Accordingly, the screen layer SCL may prevent foreign substances from being introduced from the outside in the folded state.

Since the screen layer SCL may contact corners of the upper plates UPT1 and UPT2 in the folding operation, the upper coating layer CTL1 may be torn. However, even though the upper coating layer CTL1 is torn, the tearing of the lower coating layer CTL2 may be prevented since the first lines SSW and the second lines STF are arranged in the weave pattern. Accordingly, the damage to the screen layer SCL, which is caused by the repeated folding and unfolding operations, may be prevented.

According to the disclosure, a durability of the screen layer SCL may increase, and the foreign substance may be effectively prevented from entering the separation space SP of the upper plates UPT1 and UPT2. Therefore, the reliability of the display device DD may be improved.

Figure 4A:
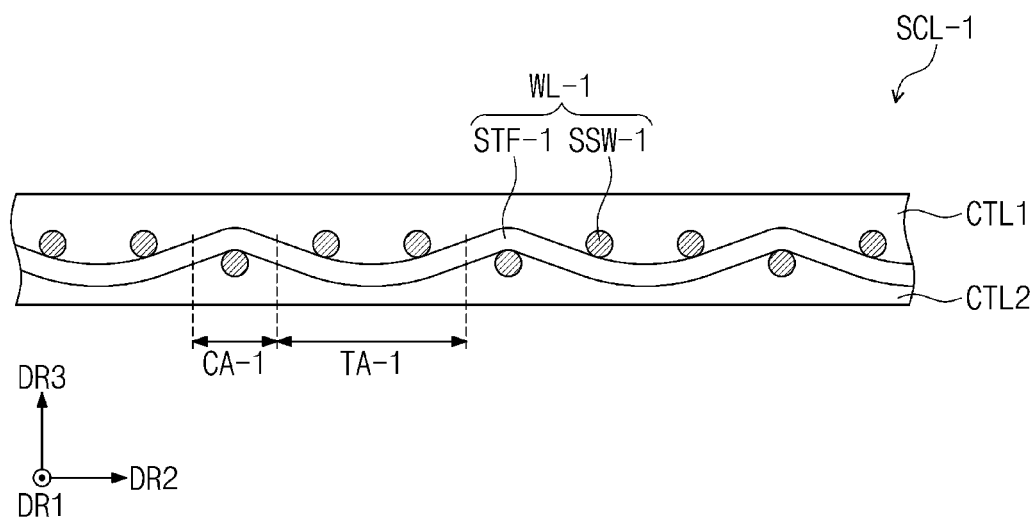
FIG. 4A is a cross-sectional view schematically showing a screen layer according to an embodiment of the disclosure.
Figure 4B:
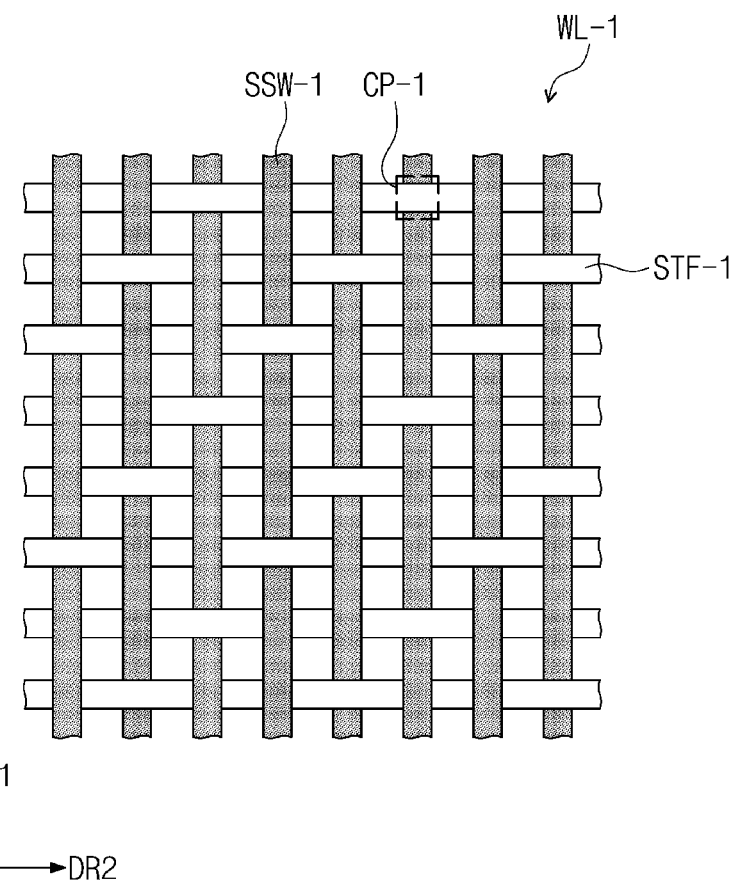
FIG. 4B is a plan view schematically showing a portion of woven lines according to an embodiment of the disclosure.
Figure 4C:
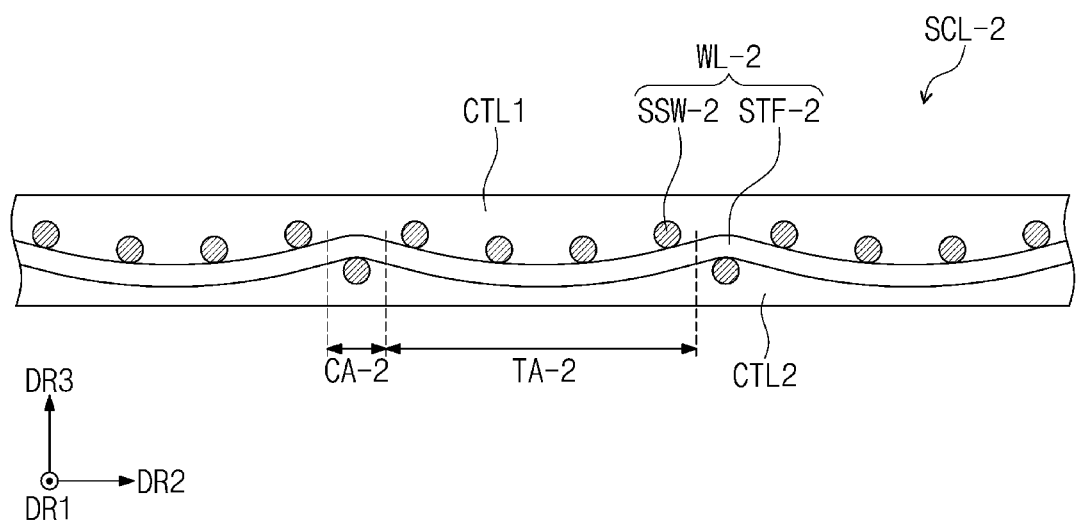
FIG. 4C is a cross-sectional view schematically showing a screen layer according to an embodiment of the disclosure.
Figure 4D:
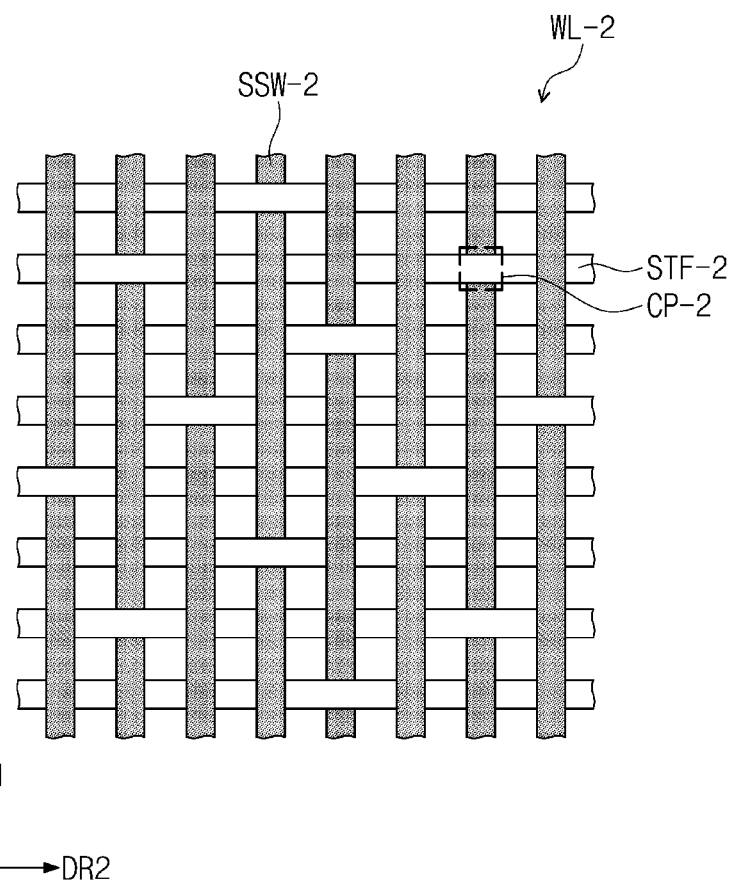
FIG. 4D is an enlarged plan view schematically showing a portion of woven lines according to an embodiment of the disclosure.

FIG. 4A is a schematic cross-sectional view illustrating a screen layer SCL-1 according to an embodiment. FIG. 4B is a schematic enlarged plan view illustrating a portion of woven lines WL-1 according to an embodiment. FIG. 4C is a schematic cross-sectional view illustrating a screen layer SCL-2 according to an embodiment. FIG. 4D is a schematic enlarged plan view illustrating a portion of woven lines WL-2 according to an embodiment. The woven lines WL-1 included in the screen layer SCL-1 shown in FIG. 4A and the woven lines WL-2 included in the screen layer SCL-2 shown in FIG. 4C are woven in different ways from each other. FIG. 4B illustrates a portion of the woven lines WL-1 of the screen layer SCL-1 shown in FIG. 4A, and FIG. 4D illustrates a portion of the woven lines WL-2 of the screen layer SCL-2 shown in FIG. 4C.

Referring to FIGS. 4A and 4B, the screen layer SCL-1 may include the woven lines WL-1, an upper coating layer CTL1, and a lower coating layer CTL2, and the woven lines WL-1 may include first lines SSW-1 and second lines STF-1.

The woven lines WL-1 may include the first lines SSW-1 extending in the first direction DR1 and arranged in the second direction DR2 and the second lines STF-1 extending in the second direction DR2 and arranged in the first direction DR1. According to an embodiment, the first lines SSW-1 may be woven with the second lines STF-1 in a twill weave.

In detail, the second lines STF-1 may include a ridge area CA-1 curved in a direction toward the upper coating layer CTL1 and a valley area TA-1 curved in a direction toward the lower coating layer CTL2 in a cross-section viewed in the first direction DR1. A first line may be disposed under the ridge area CA-1, and two first lines may be disposed on the valley area TA-1.

Each of the second lines STF-1 may include ridge areas CA-1 and valley areas TA-1 alternately arranged with each other. For example, each of the second lines STF-1 may be disposed to have a wave form when viewed in the cross-section.

Although a cross-section viewed in the second direction DR2 is not shown separately, the first lines SSW-1 and the second lines STF-1 when viewed in the second direction DR2 may have a cross-section similar to a cross-section thereof when viewed in the first direction DR1.

The first lines SSW-1 may have a structure in which ridge areas and valley areas alternately arranged with each other in the cross-section viewed in the second direction DR2. Two second lines may be disposed under each of the ridge areas, and a second line may be disposed on each of the valley areas.

Based on a structure in which the first line is disposed at an upper side and the second line is disposed at a lower side, portions at which the first line is disposed at the lower side and the second line is disposed at the upper side may be defined as crossing points CP-1. The crossing points CP-1 of the woven lines WL-1 in the twill weave may be arranged in an oblique direction.

The number of the crossing points CP-1 of the woven lines WL-1 shown in FIGS. 4A and 4B may be smaller than the number of the crossing points CP of the woven lines WL shown in FIGS. 3A and 3B. Accordingly, the toughness of the woven lines WL-1 shown in FIGS. 4A and 4B may decrease compared with the toughness of the woven lines WL shown in FIGS. 3A and 3B. However, the flexibility of the woven lines WL-1 shown in FIGS. 4A and 4B may increase compared with the flexibility of the woven lines WL shown in FIGS. 3A and 3B.

In the woven lines WL-1 shown in FIGS. 4A and 4B, portions of the second lines STF-1 disposed under the first lines SSW-1 may be greater than portions of the second lines STF-1 disposed on the first lines SSW-1. However, they should not be limited thereto or thereby. As an example, a first line may be disposed on the valley area TA-1 of the second lines STF-1, and two first lines may be disposed under the ridge area CA-1 of the second lines STF-1.

Referring to FIGS. 4C and 4D, the woven lines WL-2 may include first lines SSW-2 extending in the first direction DR1 and arranged in the second direction DR2 and second lines STF-2 extending in the second direction DR2 and arranged in the first direction DR1. According to an embodiment, the first lines SSW-2 may be woven with the second lines STF-2 in a satin weave. As illustrated in FIGS. 4C and 4D, the same or similar reference numerals denote the same or similar elements shown in FIGS. 3A to 4B, and thus, detailed descriptions thereof will be omitted.

In a cross-section viewed in the first direction DR1, each of the second lines STF-2 may include a ridge area CA-2 and a valley area TA-2, a first line may be disposed under the ridge area CA-2, and four first lines may be disposed on the valley area TA-2. Each of the second lines STF-2 may include ridge areas CA-2 and valley areas TA-2 alternately arranged with each other.

Although not shown separately, in a cross-section viewed from the second direction DR2, the first lines SSW-2 may have a structure in which the ridge areas are alternately arranged with the valley areas. Four second lines may be disposed under each of the ridge areas, and a second line may be disposed on each of the valley areas.

In the woven lines WL-2 woven in the satin weave, crossing points CP-2 may be arranged in a dispersed manner rather than being arranged to be adjacent to each other. In case that the woven lines WL-2 shown in FIGS. 4C and 4D are compared with the woven lines WL shown in FIGS. 3A and 3B and the woven lines WL-1 shown in FIGS. 4A and 4B, the number of the crossing points CP-2 in the woven lines WL-2 shown in FIGS. 4C and 4D may be smaller than the number of the crossing points in the woven lines WL, WL-1. Accordingly, the woven lines WL-2 shown in FIGS. 4C and 4D may have the least toughness but the highest flexibility.

Accordingly, in case that the durability of the screen layer SCL is important, the screen layer SCL may include the woven lines WL woven in the plain weave, and in case that the smooth bending of the screen layer SCL-2 is important, the screen layer SCL-2 may include the woven lines WL-2 woven in the satin weave.

FIGS. 4C and 4D illustrate an example of an arrangement of the woven lines WL-2 woven in the satin weave. As an example, the number of the first lines SSW-2 disposed on the valley area TA-2 of the second lines STF-2 may be greater than four.

In the woven lines WL-2 shown in FIGS. 4C and 4D, portions of the second lines STF-2 disposed under the first lines SSW-2 may be greater than portions of the second lines STF-2 disposed on the first lines SSW-2. However, they should not be limited thereto or thereby. As an example, a first line may be disposed on the valley area TA-2 of the second lines STF-2, and four first lines may be disposed under the ridge area CA-2 of the second lines STF-2.

Figure 5:
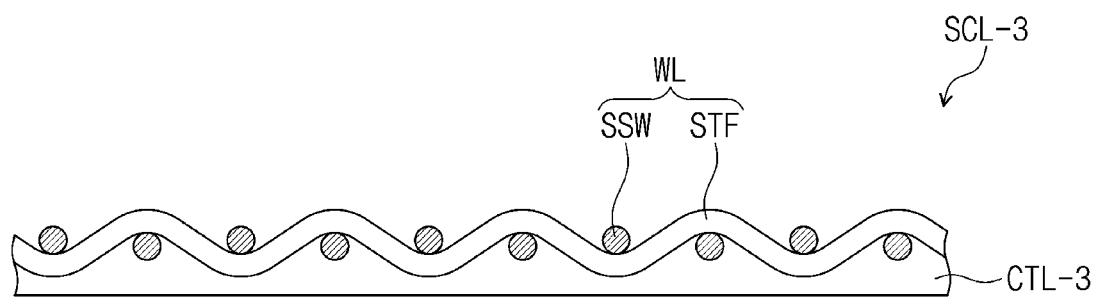
FIG. 5 is a cross-sectional view schematically showing a screen layer according to an embodiment of the disclosure.

FIG. 5 is a schematic cross-sectional view illustrating a screen layer SCL-3 according to an embodiment. The screen layer SCL-3 may include woven lines WL and a lower coating layer CTL-3. When compared with the embodiments shown in FIGS. 3A to 4D, the upper coating layer may be omitted in FIG. 5.

According to an embodiment, the screen layer SCL-3 may prevent foreign substances from entering through the separation space SP between the first upper plate UPT1 and the second upper plate UPT2 described with reference to FIG. 2C due to the lower coating layer CTL-3.

Even though the first upper plate UPT1 and the second upper plate UPT2 are disposed to face each other in the folding operation and the screen layer SCL-3 contacts the first side surface SS1 (see FIG. 2C) of the first upper plate UPT1 and the second side surface SS2 (see FIG. 2C) of the second upper plate UPT2, there is a low possibility that the lower coating layer CTL-3 is torn since the first lines SSW and the second lines STF are interlaced in a weave pattern. Accordingly, as shown in FIG. 5, even though the screen layer SCL-3 includes only the lower coating layer CTL-3, the function of the screen layer SCL-3 to prevent the foreign substances from entering the separation space SP may be maintained.

Although the embodiments of the disclosure have been described, it is understood that the disclosure should not be limited to these embodiments but various changes and modifications can be made by one ordinary skilled in the art within the spirit and scope of the disclosure as hereinafter claimed. Therefore, the disclosed subject matter should not be limited to any single embodiment described herein, and the scope of the claimed invention shall be determined according to the attached claims.

What is claimed is:

1. A display device comprising:
   a display panel comprising:
      a first non-folding area;
      a second non-folding area; and
      a folding area disposed between the first non-folding area and the second non-folding area and foldable with respect to a folding axis extending in a first direction;
   a first upper plate disposed under the display panel and overlapping the first non-folding area in a plan view;
   a second upper plate disposed under the display panel, overlapping the second non-folding area in a plan view, and arranged to be spaced apart from the first upper plate in a second direction intersecting the first direction, a separation space being disposed between the first and second upper plates and overlapping at least a portion of the folding area in a plan view in an unfolded state; and
   a screen layer disposed under the first upper plate and the second upper plate, the screen layer comprising:
      first lines;
      second lines arranged in a weave pattern with the first lines; and
      a lower coating layer covering a lower portion of the first lines and the second lines,
   wherein the screen layer overlaps the separation space in a plan view.

2. The display device of claim 1, wherein
   each of the first and second upper plates comprises:
      an upper surface disposed adjacent to the display panel; and
      a side surface defining the separation space,
   the upper surface of the first upper plate faces the upper surface of the second upper plate in a folded state, and
   the screen layer contacts the side surface of the first upper plate and the side surface of the second upper plate in the folded state.

3. The display device of claim 1, wherein
   the first lines extend in the first direction, are arranged in the second direction, and comprise a steel fiber, and
   the second lines extend in the second direction, are arranged in the first direction, and comprise a synthetic fiber.

4. The display device of claim 1, wherein
   the first lines extend in the first direction, are arranged in the second direction, and have a strength stronger than the second lines, and
   the second lines extend in the second direction, are arranged in the first direction, and have an elasticity higher than the first lines.

5. The display device of claim 1, wherein the screen layer further comprising:
   an upper coating layer covering an upper portion of the first and second lines.

6. The display device of claim 5, wherein each of the upper coating layer and the lower coating layer comprises a thermoplastic polyurethane elastomer.

7. The display device of claim 1, further comprising:
   a first adhesive layer disposed between the first upper plate and the screen layer; and
   a second adhesive layer disposed between the second upper plate and the screen layer,
   wherein each of the first adhesive layer and the second adhesive layer does not overlap the folding area in a plan view.

8. The display device of claim 1, wherein
   each of the second lines comprises:
      valley areas each disposed under one of the first lines in a cross-section; and
      ridge areas each disposed on another one of the first lines in the cross-section, and
   the valley areas are alternately arranged with the ridge areas.

9. The display device of claim 1, wherein
   each of the second lines comprises:
      valley areas each disposed under two of the first lines in a cross-section; and
      ridge areas each disposed on one of the first lines in the cross-section, and
   the valley areas are alternately arranged with the ridge areas.

10. The display device of claim 1, wherein
    each of the second lines comprises:
       valley areas each disposed under four of the first lines in a cross-section; and
       ridge areas each disposed on one of the first lines in the cross-section, and
    the valley areas are alternately arranged with the ridge areas.

11. The display device of claim 1, wherein the screen layer has a width equal to or greater than about 1 millimeter in a cross-section in the unfolded state.

12. The display device of claim 1, further comprising:
    lower plates disposed under the screen layer,
    wherein the lower plates comprise:
       a first lower plate overlapping the first non-folding area in a plan view; and
       a second lower plate disposed to be spaced apart from the first lower plate.

13. A display device comprising:
    a display panel comprising:
       a first non-folding area;
       a second non-folding area; and
       a folding area disposed between the first non-folding area and the second non-folding area and foldable with respect to a folding axis extending in a first direction;
    a first upper plate disposed under the display panel and overlapping the first non-folding area in a plan view;
    a second upper plate disposed under the display panel, overlapping the second non-folding area in a plan view, and arranged to be spaced apart from the first upper plate; and
    a screen layer disposed under the first upper plate and the second upper plate and overlapping the folding area in a plan view, the screen layer comprising:
       first lines extending in the first direction and arranged in a second direction intersecting the first direction;

second lines extending in the second direction to intersect the first lines and arranged in a weave pattern with the first lines; and a lower coating layer covering a lower portion of the first lines and the second lines, wherein the second lines have an elasticity greater than an elasticity of the first lines.

14. The display device of claim 13, wherein the first lines comprise a steel fiber, and the second lines comprise a synthetic fiber.

15. The display device of claim 13, wherein the screen layer further comprises an upper coating layer covering an upper portion of the first and second lines.

16. The display device of claim 15, wherein each of the upper coating layer and the lower coating layer comprises a thermosetting polyurethane elastomer.

17. The display device of claim 13, wherein each of the second lines comprises:

valley areas each disposed under one of the first lines in a cross-section; and ridge areas each disposed on another one of the first lines in the cross-section, and the valley areas are alternately arranged with the ridge areas.

18. The display device of claim 13, wherein each of the second lines comprises:

valley areas each disposed under two of the first lines in a cross-section; and ridge areas each disposed on one of the first lines in the cross-section, and the valley areas are alternately arranged with the ridge areas.

19. The display device of claim 13, wherein each of the second lines comprises:

valley areas each disposed under four of the first lines in a cross-section; and ridge areas each disposed on one of the first lines in the cross-section, and the valley areas are alternately arranged with the ridge areas.

20. The display device of claim 13, wherein the first upper plate and the second upper plate are arranged in the second direction, a separation space is disposed between the first and second upper plates and overlaps the folding area in a plan view in an unfolded state, and the screen layer overlaps the separation space in a plan view.

\* \* \* \* \*